US007880577B1

(12) United States Patent
Glaser et al.

(10) Patent No.: US 7,880,577 B1
(45) Date of Patent: Feb. 1, 2011

(54) CURRENT DOUBLER RECTIFIER WITH CURRENT RIPPLE CANCELLATION

(75) Inventors: John Stanley Glaser, Niskayuna, NY (US); Michael Andrew de Rooij, Schenectady, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1130 days.

(21) Appl. No.: 11/510,193

(22) Filed: Aug. 25, 2006

(51) Int. Cl.
*H01F 27/28* (2006.01)
*H01F 21/08* (2006.01)
*H02J 1/02* (2006.01)
*H02M 1/12* (2006.01)
*H02H 7/125* (2006.01)
*G05F 3/06* (2006.01)

(52) U.S. Cl. ............. 336/184; 336/160; 336/165; 336/170; 336/222; 363/39; 363/44; 363/46; 363/52; 323/308

(58) Field of Classification Search ............. None
See application file for complete search history.

(56) References Cited

U.S. PATENT DOCUMENTS

| | | | | | |
|---|---|---|---|---|---|
| 2,170,446 | A | * | 8/1939 | Edwards | 315/239 |
| 2,298,935 | A | * | 10/1942 | Freeman | 315/97 |
| 2,460,773 | A | * | 2/1949 | Stimson | 336/67 |
| 2,551,696 | A | * | 5/1951 | Ogurkowski | 336/178 |
| 2,846,637 | A | * | 8/1958 | Huge | 363/77 |
| 3,340,458 | A | * | 9/1967 | Keller | 363/48 |
| 3,913,583 | A | * | 10/1975 | Bross | 606/35 |
| 3,932,804 | A | * | 1/1976 | Allen | 323/356 |
| 4,864,478 | A | * | 9/1989 | Bloom | 363/16 |
| 6,037,686 | A | * | 3/2000 | Schonauer et al. | 310/72 |
| 6,693,805 | B1 | * | 2/2004 | Steigerwald et al. | 363/39 |
| 6,856,230 | B2 | * | 2/2005 | Lu | 336/212 |
| 7,136,293 | B2 | * | 11/2006 | Petkov et al. | 363/126 |
| 7,199,692 | B2 | * | 4/2007 | Suzuki et al. | 336/170 |
| 7,209,024 | B2 | * | 4/2007 | Nakahori | 336/170 |
| 7,449,799 | B2 | * | 11/2008 | Levin et al. | 307/105 |
| RE40,907 | E | * | 9/2009 | Steigerwald et al. | 363/39 |
| 2005/0068792 | A1 | * | 3/2005 | Yasumura | 363/21.06 |
| 2005/0073863 | A1 | * | 4/2005 | de Rooij et al. | 363/39 |
| 2006/0037461 | A1 | * | 2/2006 | Yasumura | 84/730 |

OTHER PUBLICATIONS

Smit et al., "Technology for Manufacture of Integrated Planar LC Structures for Power Electronic Applications", The European Power Electronics Association, 1993, pp. 173-178.
Kolar et al., "Novel Aspects of an Application of 'Zero'-Ripple Techniques to Basic Converter Topologies", IEEE, 1997, pp. 796-803.
Pietkiewicz et al., "Coupled-Inductor Current-Doubler Topology in Phase-Shifted Full-Bridge DC-DC Converter", IEEE, 1998, pp. 41-48.
Xu et al., "A Novel Integrated Current Doubler Rectifier", IEEE, 2000, pp. 735-740.
Schutten et al., "Ripple Current Cancellation Circuit", IEEE, 2003, pp. 464-.

* cited by examiner

*Primary Examiner*—Anh T Mai
*Assistant Examiner*—Mangtin Lian
(74) *Attorney, Agent, or Firm*—Howard IP Law Group, PC (57) ABSTRACT

A ripple reduction circuit for use in a current doubler rectifier has first and second inductors coupled via a first coupling coefficient. The first and second inductors generate a first and a second ripple current, respectively. A third inductor is coupled to the first and second inductors; and an impedance is connected in series with the third inductor, wherein the circuit generates a third ripple current opposing the combination of the first and second ripple currents generated by the first and second inductors.

18 Claims, 9 Drawing Sheets

CURRENT DOUBLER RECTIFIER WITH CURRENT RIPPLE CANCELLATION

FIELD OF INVENTION

This invention relates in general to power converters and, in particular, to a current doubler power converter employing ripple cancellation.

BACKGROUND OF THE INVENTION

An ideal power converter provides high efficiency and generates output waveforms that are relatively constant. This is in the ideal world. Unfortunately, switching converters are used to provide high efficiency, but generate a periodic deviation from the desired output. This periodic deviation is known as switching ripple, or simply, ripple. In the conventional application, the ripple is reduced by the use of typical filtering elements, such as inductors and capacitors, which are configured as low pass filters. For applications requiring stringent specifications on output ripple, such filters become inordinately large, very complex and extremely expensive. All of these constraints and limitations conflict with other requirements.

Recently, a more general ripple cancellation technique was conceived that applies to a broad class of switching converters. For an example of such a technique, reference is made to the paper presented at the Applied Power Electronics Conference and Exposition, 2003, APEC-03 18th Annual IEEE Volume 1, 2003, pages 464 to 470 entitled, "A Type of Ripple Current Cancellation Circuit" by M. J. Schutten, et al. This paper discloses a ripple cancellation technique that can operate with a broad class of switching converters. The circuit described in that article works to cancel the ripple in a single inductor only.

As indicated above in some cases, one can cancel ripple by filtering techniques. See, for example, an article entitled, "Novel Aspects of an Application of a Zero Ripple Techniques to Basic Converter Technologies" by J. W. Kolar, et al., Volume 1, Issue 22-27, June 1997, Power Electronics Specialist Conference, 1997 PESC 97 record, pages 796 to 803, Volume 1.

It is desirable to reduce ripple in a more economical and efficient way. In the present invention, a passive ripple cancellation circuit is employed to reduce the output ripple of a current doubler rectifier. A current doubler rectifier is often advantageous when a high output current and a low voltage is desired. Versions of the ripple cancellation circuit, according to embodiments of this invention, apply to current doublers.

SUMMARY OF INVENTION

According to an aspect of the present invention, a ripple reduction circuit for use in a current doubler rectifier having first and second inductors coupled via a first coupling coefficient, the first and second inductors generating a first and a second ripple current, respectively, comprising: a third inductor coupled to the first and second inductors; and an impedance connected in series with the third inductor, wherein the circuit generates a third ripple current opposing the combination of the first and second ripple currents generated by the first and second inductors and to negate or nullify the first and second ripple currents at an output of the ripple reduction circuit. In a preferred embodiment, the third ripple current is equal in magnitude and opposite in sign to the combined first and second ripple currents to nullify the output ripple current.

According to another aspect, a ripple reduction circuit for use in a current doubler rectifier having first and second inductors coupled via a first coupling coefficient, the first and second inductors generating first and second ripple currents, comprising: a third inductor coupled to the first inductor; a fourth inductor coupled to the second inductor; and an impedance connected in series with the third and fourth inductors, wherein the circuit generates a third ripple current opposing the first and second ripple currents of the first and second inductors and cancels the first and second ripple currents at an output of the ripple reduction circuit.

In an exemplary, non-limiting embodiment, a current doubler rectifier having a first input terminal of a first inductor and a first input terminal of a second inductor operative to receive an input signal to the doubler with the other terminals of the first and second inductors connected together to provide a first output terminal, the first input terminal of the first inductor coupled to the first given electrode of a first rectifier, a second electrode of the first rectifier coupled to a second output terminal, with the first input terminal of the second inductor coupled to a first given electrode of a second rectifier, with a second electrode of the second rectifier coupled to the second output terminal, a load capacitor coupled between the first and second output terminals and a load resistor coupled in parallel with the capacitor across the first and second output terminals, the combination therewith of apparatus for reducing ripple at the output of the current doubler rectifier, by magnetically coupling the first and second inductors which comprise an "E" core magnetic structure having a common base, a right arm, a center arm and a left arm of the "E", each arm extending transversely from the base and relatively parallel to one other, an "I" core positioned relatively parallel to the base and extending across the end of each of said arms remote from the base to create a gap between each of the arms and the "I" core, a first winding located on the right arm of the "E" core to provide the first inductor, a second winding located on the left arm of the "E" core to provide the second inductor, the first and second inductors being magnetically coupled with a coupling coefficient determined by the ratio of the gap lengths between the arms, a third winding on the center arm of the core, the third winding magnetically coupled to the first and second windings, to induce a current in the center winding when current flows in the first and second windings and impedance means directed from one terminal of the center winding to the second output terminal, with the other terminal of the center winding connected to the first output terminal, the center winding operative with the impedance means to provide substantial ripple cancellation across the first and second output terminals according to the ripple current flowing in the first and second windings.

BRIEF DESCRIPTION OF THE FIGURES

FIG. 6 shows the present invention which is an improvement over the configurations of FIGS. 4 and 5. In FIG. 6, a single additional winding on a transformer core is combined with a single inductor and single capacitor to implement the ripple cancellation circuit on a current doubler rectifier.

DETAILED DESCRIPTION OF THE FIGURES

According to aspects of the present invention, various embodiments of circuits are described herein which operate to reduce ripple in a current doubler rectifier apparatus. The operation of such circuits may result in a reduction in the number of and/or size of magnetic components while further providing a 2:1 voltage step down transformer ratio. The circuits provide for good transient response and further reduce the number of components as compared to prior art techniques.

There is disclosed a ripple reduction circuit applied to a current doubler rectifier via the addition of two windings on the main inductors, two small inductors and two capacitors that carry AC components of each of the main inductor current with reversed polarity, such that the total AC current is reduced. The main inductors may be coupled or uncoupled.

In one embodiment, the total of the currents flowing in the two ripple reduction inductors and windings flows in a single capacitor.

In another embodiment, main inductors are coupled via the addition of one additional winding on the main inductor core, where each main inductor couples to the additional winding. A single additional small inductor and capacitor may be used in conjunction with the additional winding to cancel the total ripple current of both main inductors.

In yet another embodiment, the main inductors are coupled via the addition of one additional winding on the main inductor core, where each main inductor couples to the additional winding, and where magnetic shunts are used to reduce the coupling of the main windings to the auxiliary winding, thereby enabling a single additional capacitor in conjunction with the additional winding to cancel the total ripple current of both main inductors.

In still another embodiment, a ripple cancellation circuit applied to a current doubler rectifier includes main inductors coupled via the addition of two additional windings on the main inductor core, where each main inductor couples to the additional windings, and the windings are connected so as to form a series capacitance whereby a single inductor may be used in conjunction with the additional windings to cancel the total ripple current of both main inductors.

In still a further embodiment, a ripple cancellation circuit applied to a current doubler rectifier includes main inductors coupled via the addition of two additional windings on the main inductor core, where each main inductor couples to the additional windings, and where magnetic shunts are used to reduce the coupling of the main windings to the auxiliary winding, so that additional windings may be used to cancel the total ripple current of both main inductors.

Figure 1:
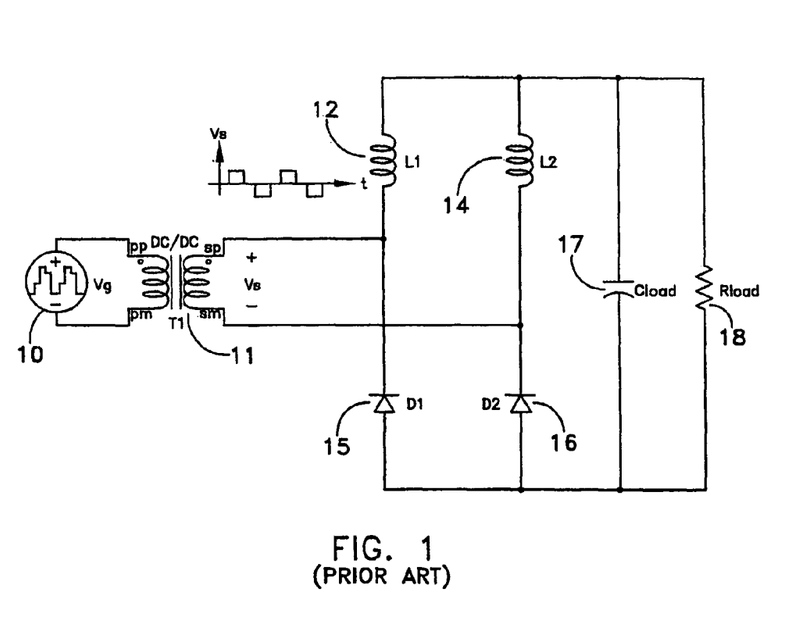
FIG. 1 shows a conventional current doubler with two inductors magnetically isolated from each other and indicative of the prior art.
Figure 2:
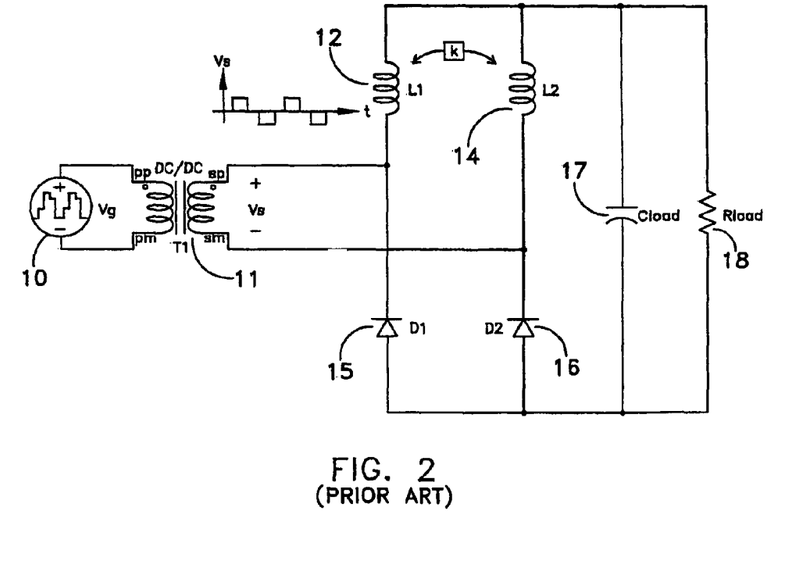
FIG. 2 shows a conventional doubler with two inductors magnetically coupled to each other as indicated in the prior art.

Referring now to FIG. 1, there is shown a prior art configuration of a typical current doubler rectifier. The descriptions of operation of current doubler rectifiers can be had by referring to an article entitled, "Coupled-Inductor Current-Doubler Topology in Phase-Shifted Full-Bridge DC-DC Converter" by A. Pietkiewicz, et al., presented at the Telecommunications Energy Conference 1998, INTELEC 20th International, Volume ISS 1998, pages 41 to 48. The circuit described in that article is shown in FIG. 2. Basically, FIG. 2 depicts a version of a current doubler rectifier where the two inductors are coupled together, as by winding the inductors on the same core. As seen in FIG. 1, the typical current doubler rectifier consists of an input source of voltage 10, where a typical waveform is depicted and the source designated as Vg. The input source 10 is applied to the primary winding of a transformer 11 having a secondary winding. One terminal of the secondary winding is connected to a first terminal of a first inductor 12 having another terminal in common with a second inductor 14. The other terminal of inductor 14 is connected to the other side of the primary winding. In series with inductor 12 is a first diode or rectifier 15 and in series with inductor 14 is a second diode or rectifier 16. The series circuits consisting of inductor 12 and diode 15 and inductor 14 and diode 16 is shunted by a load capacitor 17 which, in turn, is shunted by an output load resistor 18. Essentially, as seen, the input from the voltage generator 10 is applied to the primary of the transformer 11 whereby the output waveform at the secondary is shown. This waveform, in turn, is suitably rectified and the voltage from both cycles is developed across capacitor 17. The current flow is twice the value of the input current, and hence, the term "doubler" is employed. The operation of the circuit shown in FIG. 1 is well known and the configuration as described above is also well known.

In FIG. 2, the same reference numerals have been utilized to designate similar parts. The doubler in FIG. 2 has inductors 12 and 14 mutually coupled one to another. The mutual coupling can be accomplished by fabricating the inductors on the same core so that there is a mutual coupling factor k between the inductors. One can provide mutual coupling by many other well known techniques. One can see that the coupling coefficient between inductors 12 and 14, as depicted in FIG. 2, is indicated by the reference numeral k. Hence, one will note that if the coupling coefficient k between inductors 12 and 14 is zero, FIG. 2 is equivalent to FIG. 1, where inductors 12 and 14 are not mutually coupled (i.e. uncoupled). The input waveform indicative of that provided by generator 10 can be provided by a variety of power conversion circuits. Such generators 10 can consist of a phase shifted or conventional PWM full bridge converter, as well as many other circuit configurations well known to one of ordinary skill in the art. The transformer 11, shown in FIGS. 1 and 2, and in many of the following Figures, is typically present in most practical converters, but is not strictly necessary.

Figure 3:
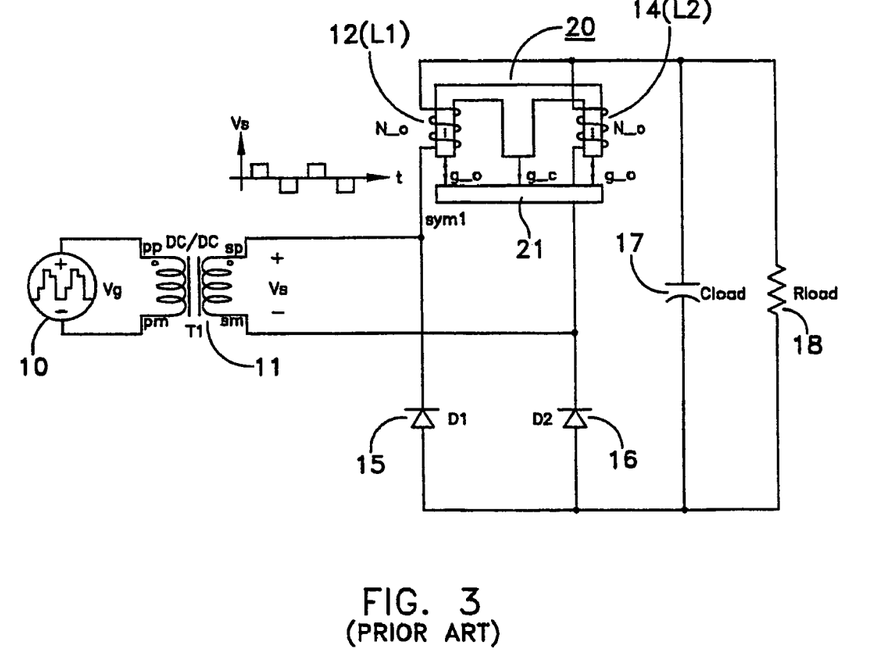
FIG. 3 depicts a typical construction for a current doubler with coupled inductors.

Referring to FIG. 3, there is shown again a converter, as depicted in FIGS. 1 and 2, whereby the inductors L1 and L2 are now represented by an integrated core 20. In the exemplary embodiment, the core 20 basically is an E-shaped member or E core which has a right arm having a first winding and a left arm having a second winding. It is understood that various different ferrite materials can be used. The right and left arms are mutually coupled to each other by the E core and I core 21. As seen, the E core is separated from the I core 21 by a given air gap. The center arm of the E core is also separated from I core 21 by an air gap, as is the inner core. By varying the length of the air gap, one can now vary the mutual coupling. The reference indicated above of Pietkiewicz, et al. gives a good summary of the operation of the current doubler rectifier. Thus, as one can see, the practical implementation of this circuit shown in FIG. 2 is utilizing an integrated core such as that shown in FIG. 3. The E-shaped core is a well-known magnetic component and analysis of this circuit is shown in many conventional textbooks on transformers or magnetic coupling circuits.

Figure 4:
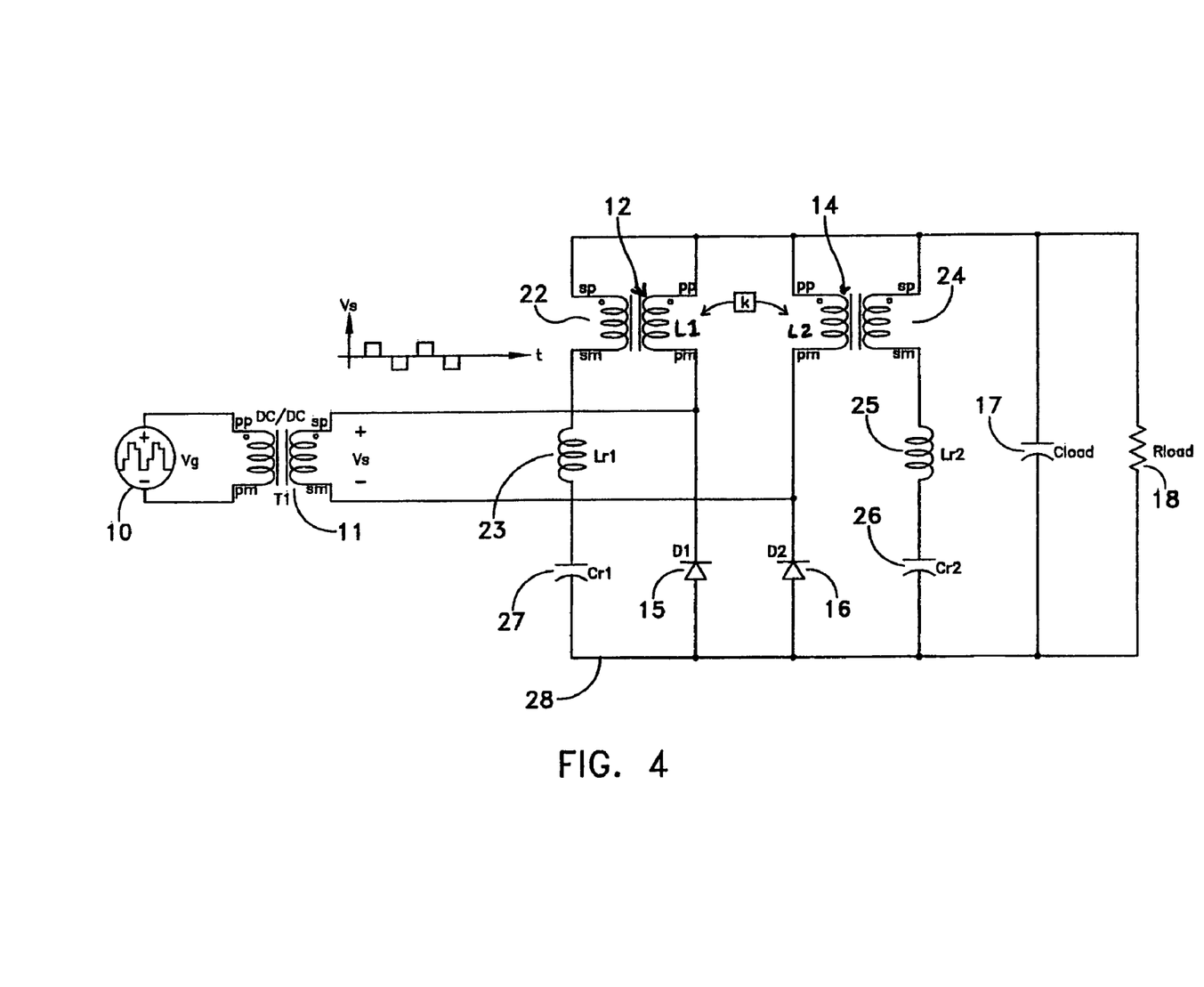
FIG. 4 shows a ripple cancellation circuit directly applied to a current doubler rectifier.

Referring to the circuit in FIG. 4, one can see that each of the inductors, as inductors 12 and 14, now constitute the primary winding of a transformer. Thus, inductor 12 is associated with a secondary winding 22, while inductor 14 is associated with a secondary winding 24. The secondary windings are implemented by employing another winding on the right and left arms of the E core. Each of the secondary windings are directed towards a common terminal 28 through an inductor and a capacitor which operate to provide ripple cancellation as, for example, described in the above noted article of Schutten, et al. Thus, the secondary winding 22 associated with inductor 12 is directed towards the common terminal 28 through inductors 23 in series with capacitor 27. The secondary winding 24 associated with inductor 14 is directed towards the same common terminal 28 via inductor 25 and capacitor 26. In virtually all other manner the circuit remains the same.

Still referring to FIG. 4, each inductor 12 and 14 has its own ripple cancellation circuit, which circuit has been described in the above-noted reference of Schutten, et al. and has all the benefits described therein. However, as one can ascertain from FIG. 4, the circuit is relatively complex and has a large number of components.

Figure 5:
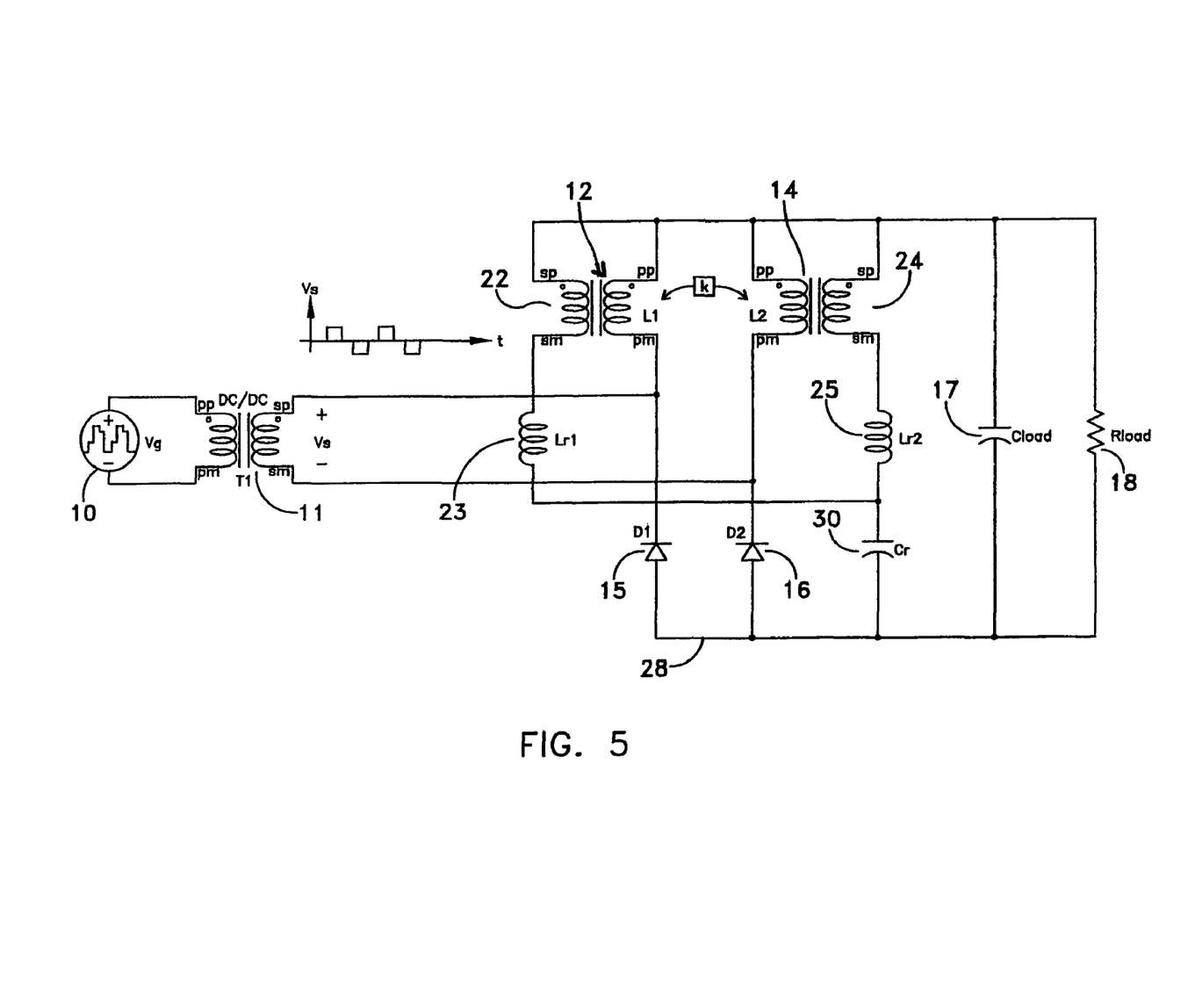
FIG. 5 shows the addition of two capacitors as shown in FIG. 4, which are combined in a single capacitor to which both inductors are connected to reduce ripple.

Referring to FIG. 5, it is seen that the circuit appears similar to the circuit in FIG. 4, except that the two capacitors shown in FIG. 4 as capacitors 26 and 27 are now combined into a single capacitor 30. Inductors 23 and 25 have one terminal connected to one terminal of capacitor 30 with the other terminal connected to the point of reference potential 28. The circuit has advantages over the circuit described in FIG. 4. First, the component count has been reduced by one capacitor. Furthermore, the amplitude of the combined ripple cancellation currents is reduced because the two currents are not in phase. This means that a smaller capacitor 30 can be used for a given ripple voltage on capacitor 30. Still further, the frequency of the combined ripple cancellation current is twice the frequency of the individual components. This allows a further reduction in the size and/or magnitude of the capacitor 30 for a given voltage ripple. These advantages are substantial in regard to the operation of the circuit of FIG. 4 and offer substantial benefits in reduced capacitor values and in more reliable operation.

Figure 6:
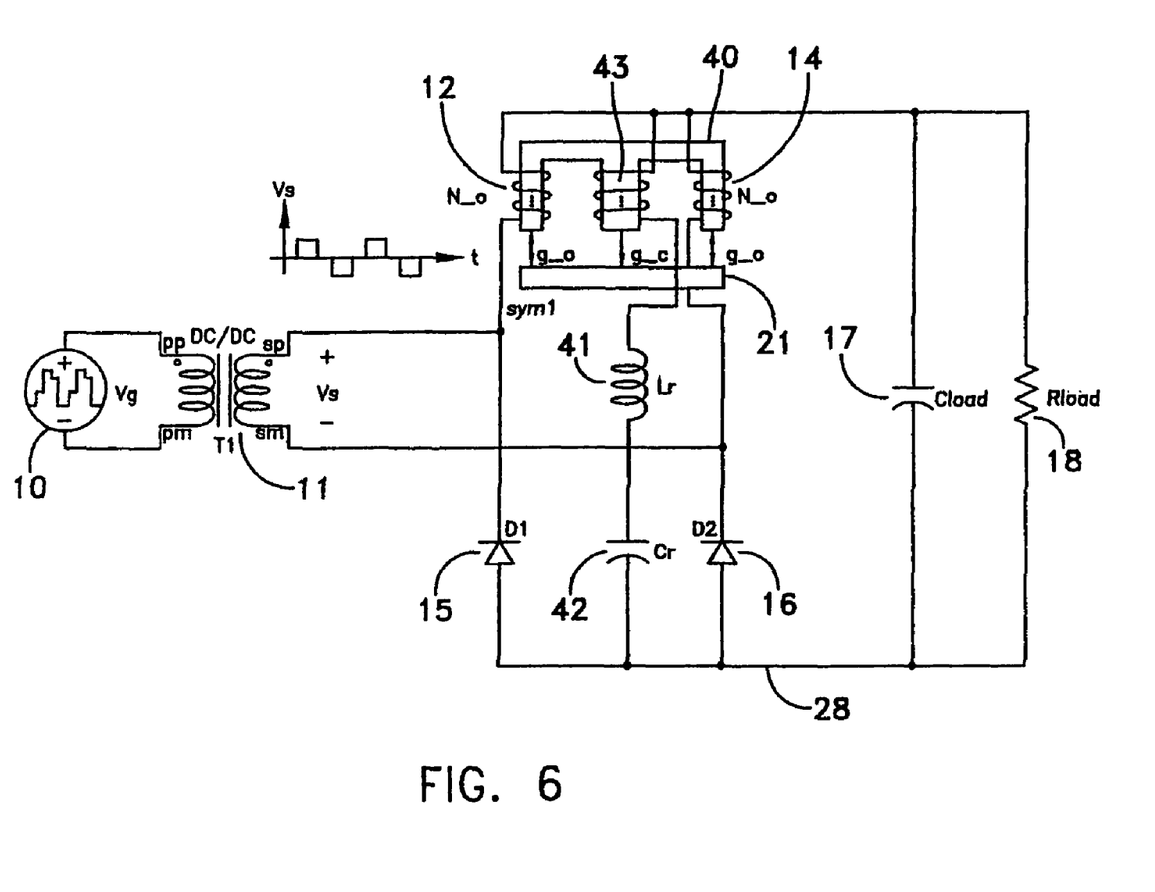

Referring to FIG. 6, there is shown another circuit configuration according to an exemplary embodiment of the present invention, wherein an additional winding 43 is disposed on the center arm of the "E" core 40. The winding 43 can be combined with a single inductor 41 and a single capacitor 42 to implement ripple cancellation for the current doubler rectifier. As one can see from FIG. 6, all components remain the same with the difference that the integrated core has an additional winding 43 on the center arm of the E. This winding 43 is now connected in series with inductor 41 and capacitor 42 to the point of reference potential or terminal 28. This now provides a ripple cancellation circuit for the doubler rectifier.

Figure 7:
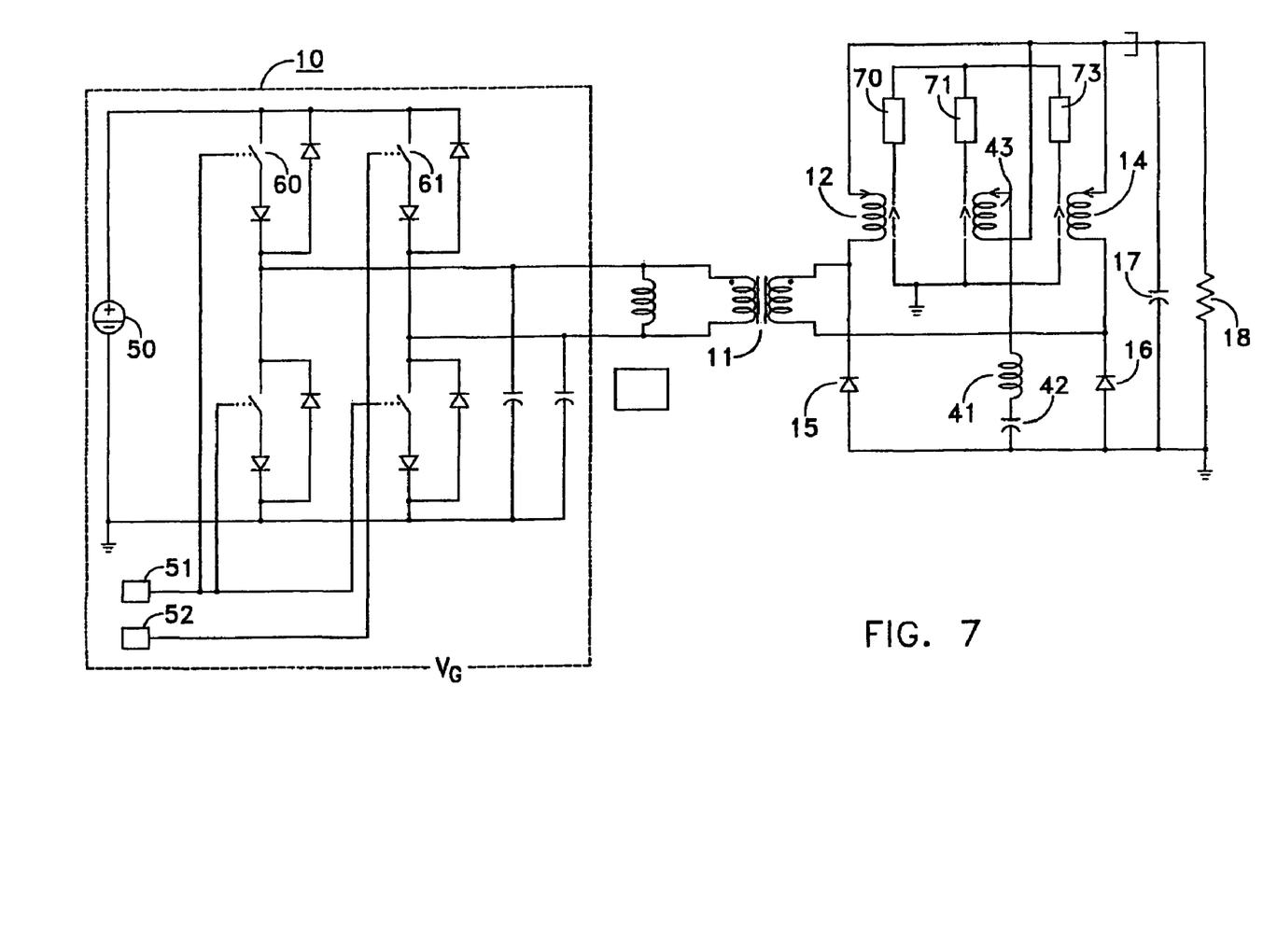
FIG. 7 shows a schematic of a typical converter according to this invention with the current doubler rectifier.

Referring to FIG. 7, there is shown a schematic of a typical converter with a current doubler rectifier circuit rectifier as described above in FIG. 6. As seen in FIG. 7, the generator Vg is now is shown in detail, which basically consists of a source of DC voltage 50 with two clock circuits 51 and 52. The clock circuits 51 and 52 control switches such as 60 and 61, for example, and operate the switches in a predetermined sequence. The switches operate in conjunction with the diodes shown to produce a pulse width modulated (PWM) waveform which implements generator 10 in the above-noted Figures. Many versions of this circuit are contemplated. In FIG. 7, the circuit shown in FIG. 6 is employed, whereby the inductors and capacitors retain the same value. Hence, inductor 12 is shown as is inductor 14 with the center winding 43 also depicted herein. Also shown is the inductor 41 in series with capacitor 42. The modules 70, 71 and 73 shown located between the inductor windings 12, inductor winding 43 and inductor winding 14 are indicative of mutual coupling between inductors. It is indicated that the mutual coupling between these inductors can be varied. The schematic circuit shown in FIG. 7 is a phase shifted full bridge converter with a current doubler rectifier. The magnetic component of FIG. 7 is modeled with a reluctance model, as these traces have been done by circuit simulation.

Figure 8:
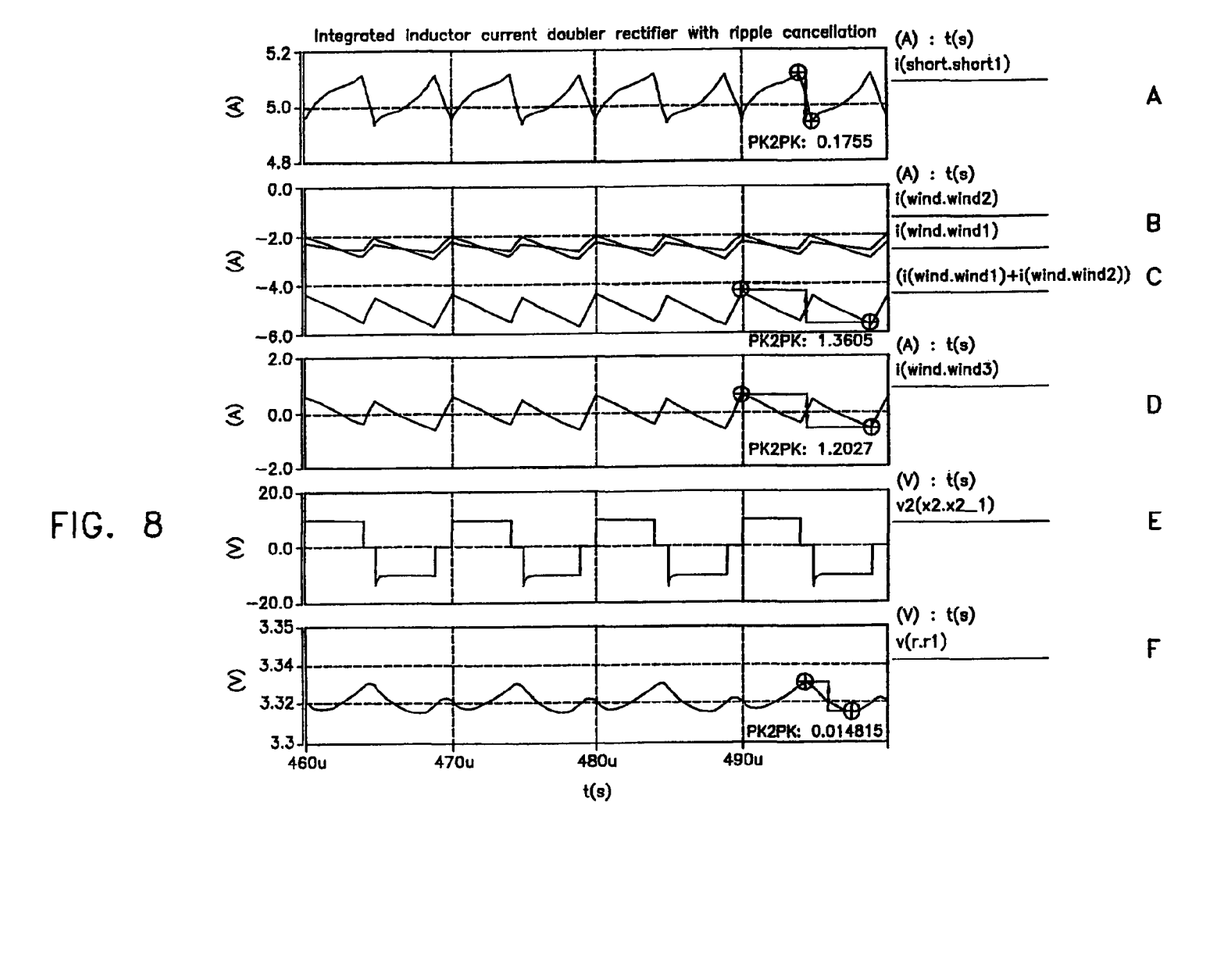
FIG. 8 shows a series of waveforms depicting operation of the current doubler depicted in FIG. 7.

Referring to FIG. 8, there are shown waveforms A, B, C, D, E and F which are representative of waveforms existing during operation of the converter of FIG. 7. The trace labels correspond to FIG. 7. The top trace 8A designated as i(short.short1) show the total ripple current into the output filter capacitor and load. This would be the output capacitors 17 and load 18. The trace shown in FIG. 8C designated as i(wind.wind1)+i(wind.wind2) shows the ripple current without cancellation. It can be seen that a seven fold reduction in peak to peak current ripple amplitude provides for the optimization or tuning of component values. Greater reductions can be achieved by fine-tuning parameters. The cancellation current in the center leg winding is shown by FIG. 8B. Note that it is nearly identical to the gray form shown in FIG. 3 so that when the signal depicted in 8C is subtracted from that of 8D, very little ripple current remains. This subtraction occurs in winding 43 via inductor 41 and capacitor 42.

Figure 9:
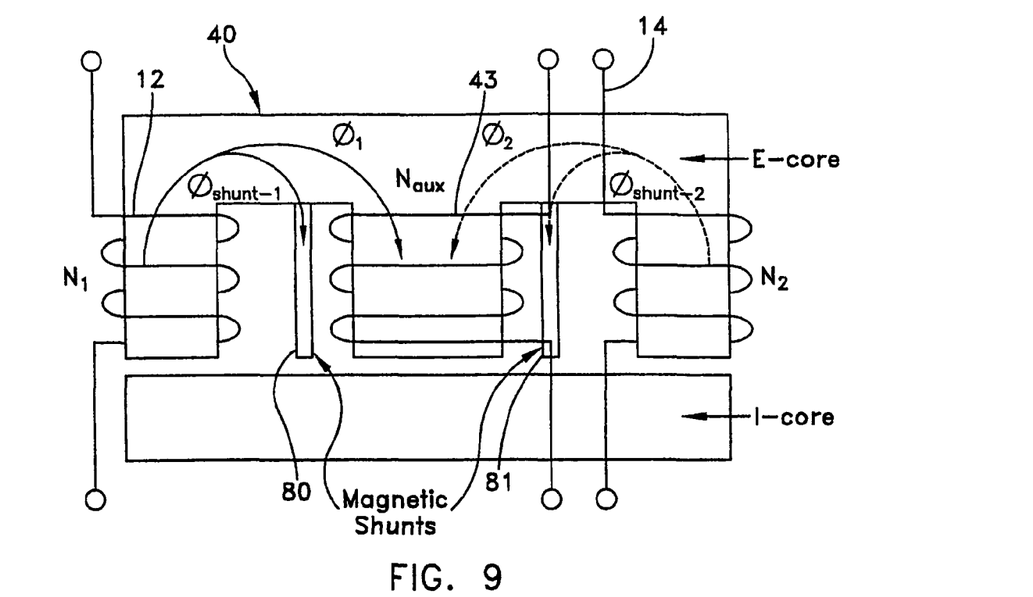
FIG. 9 shows a schematic diagram depicting an inductor integrated into the core by the addition of magnetic shunts between inductor windings.

Referring to FIG. 9, there is shown a typical integration of the inductance A1 into the magnetic structure by insertion of magnetic shunts about the winding 43. The magnetic shunts are shown by reference numerals 80 and 81. As seen in FIG. 9, the E-core consists of the left and right hand sections, which constitute inductors 12 and 14 with the center winding 43 shown therein. The E-core is shown adjacent to the I-core 21. As noted above, the spacing between the I and E cores and, therefore, the arms can be changed to change the coupling.

Figure 10:
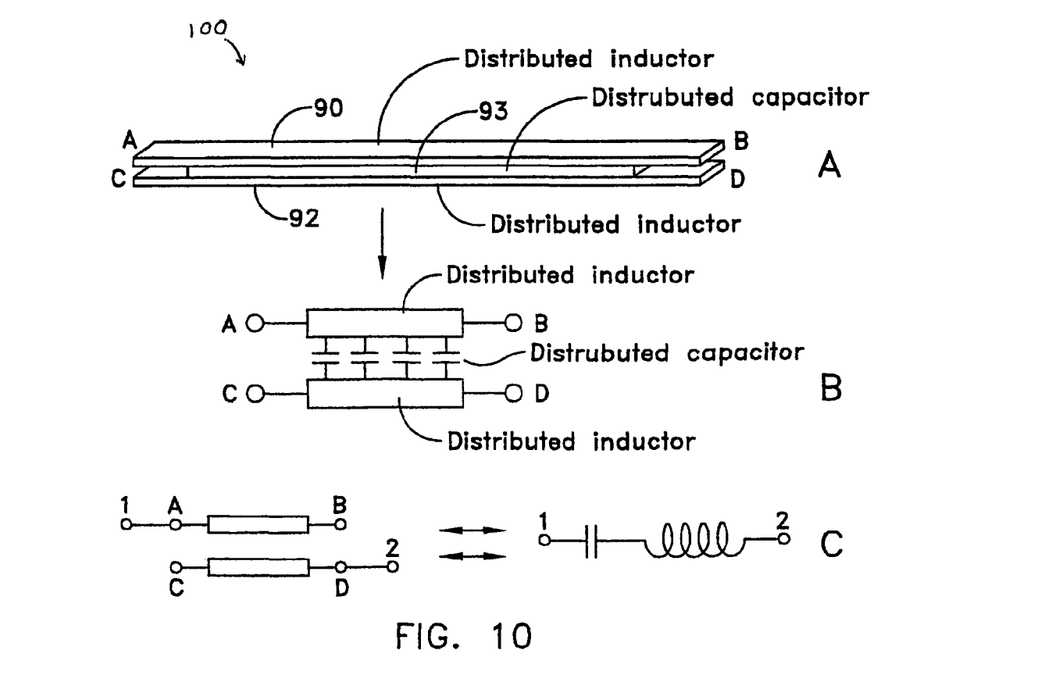
FIG. 10 shows the construction of an embedded capacitor cable used to integrate the capacitance into a magnetic structure associated with the current doubler rectifier according to an embodiment of the present invention.

In FIG. 10, which includes FIGS. 10A, B and C, it is shown that one can integrate the capacitor, as, for example, capacitor 42 of FIG. 6 into the magnetic structure. This can be accomplished by means of a cable with an embedded capacitor. FIG. 10 shows a top conductor 90 with a bottom conductor 92. Located or sandwiched between the conductors is a dielectric layer 93. The equivalent circuit is shown as FIG. 10B, while the distributive impedance is shown in FIG. 10C. The cable, as indicated, comprises a dielectric substrate 93, such as a polyimide with a conductor, such as copper, on the top surface 90 and the bottom surface 92. The conductors can be secured to the dielectric substrate, such as via heat, electroplating, adhesive coupling (e.g. glue), for example. The conductors can also be directly bonded to the substrate, such as by means of sputtering the conductors on the dielectric. FIG. 10B shows the equivalent circuit model of the embedded capacitive cable and FIG. 10C shows that by using terminals A and B, a series capacitor and inductor can be obtained. This can operate in conjunction with the magnetic structure embodied in FIG. 9 to provide a compact circuit element.

Figure 11:
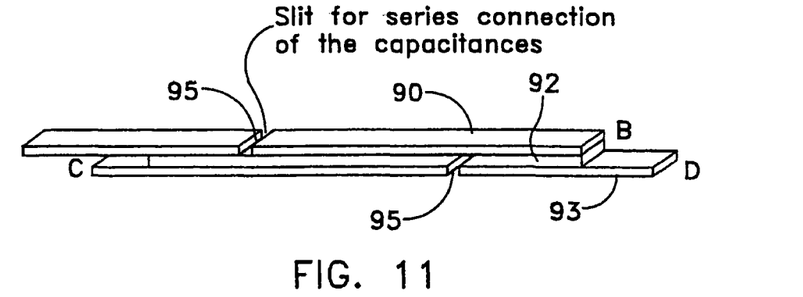
FIG. 11 is a diagram showing an embedded capacitor cable which is modified by the introduction of slits to enable adjusting the value of capacitance for use in a current doubler rectifier according to this invention.

In FIG. 11 there are depicted slots 95 in the conductors. The value of the capacitor of the cable can be varied by cutting or forming slots 95 into the conductors 90 and 93. These slots 95 can reduce the capacitance by effectively connecting many similar capacitance in series.

Figure 12:
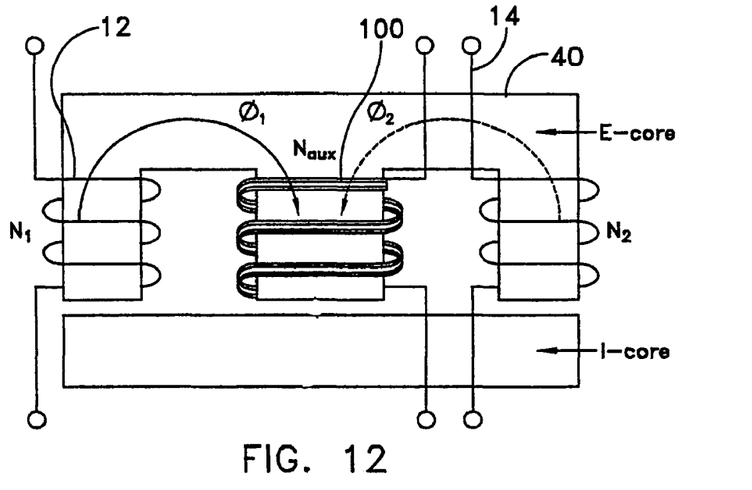
FIG. 12 depicts a capacitor which can be integrated into a winding, thereby eliminating the need for an external capacitor in operation with a current doubler rectifier.

FIG. 12 depicts another variation of the E-core arrangement with a center winding 100. The coil 12 (N1 turns) is wound on the left arm of the E-core while coil or inductor 14 (N2 turns) is wound on the right arm. In this manner, the center winding 100 includes winding 43 (FIG. 9) and including the capacitor and inductor as necessary for ripple reduction, such as capacitor 42 and inductor 41, as shown in FIG. 6. Thus, the cable, as indicated, in FIG. 12, designated by reference numeral 100, would constitute the winding 43 plus the capacitor 42 and inductor 41 shown in FIG. 6. The winding 100 thus includes the cable of FIG. 10 wound about the center arm of the E core to form winding 43, capacitor 42 and inductor 41.

Figure 13:
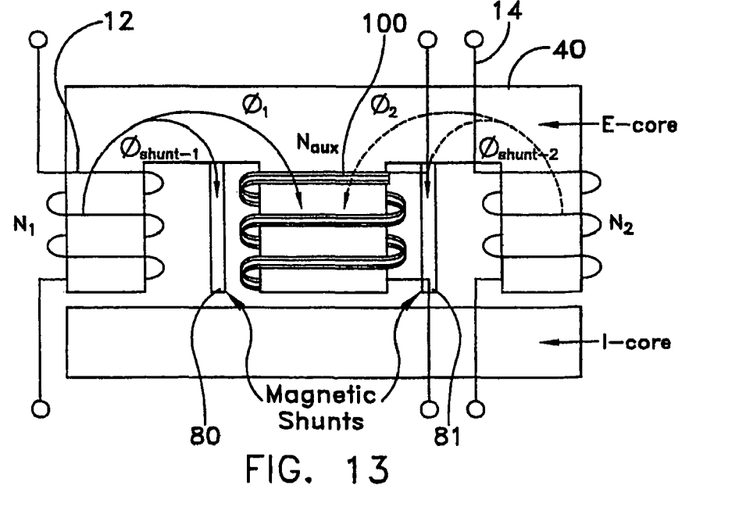
FIG. 13 is a diagram showing how an inductor and capacitor can be combined into the same core as the main inductor of a current rectifier according to an embodiment of the present invention.

FIG. 13 shows the complete integration of the ripple cancellation circuit into the magnetic structure using both the magnetic shunts, as for example, depicted in FIG. 9. Magnetic shunts 80 and 81 of FIG. 9 are employed in conjunction with the embedded capacitor cable of FIG. 10 and further utilized in FIG. 12. As shown therein, a first magnetic shunt is between the first and third windings; and a second magnetic shunt is between the second and third windings, thereby reducing a coupling coefficient between the first and third windings and between the second and third windings. In particular, the first magnetic shunt is between a left arm and a middle arm of the "E" core and the second magnetic shunt is between a right arm and a middle arm of said "E" core. Other configurations are also contemplated, as for example, a first magnetic shunt between the first and the third and fourth windings; and a second magnetic shunt between the second and the third and fourth windings, thereby reducing coupling coefficients between the first and second and the third and fourth windings. In particular, wherein the inductor core is an "E" core, the first winding is on a left arm of the "E" core, the second winding is on a right arm of said "E" core, the third and fourth windings are on a middle arm of the "E" core, the first magnetic shunt is between a left arm and a middle arm of the "E" core and the second magnetic shunt is between a right arm and a middle arm of the "E" core.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. For example, while embodiments have been described utilizing two E cores, it is contemplated that two U cores may be used, with a third winding coupled to an existing other winding. It is contemplated that the appended claims will cover any such modifications or embodiments as fall within the true scope of the invention.

What is claimed is:

1. A ripple reduction circuit for use in a current doubler rectifier having first and second inductors electrically connected and magnetically coupled via a first coupling coefficient, said first and second inductors generating a first and a second ripple current, respectively, comprising:
   a third inductor electrically and magnetically coupled to each of said first and second inductors; and
   an impedance connected in series with said third inductor, wherein said circuit generates a third ripple current opposing the combination of said first and second ripple currents generated by said first and second inductors, said first inductor having a first winding, second inductor having a second winding, and said third inductor having a third winding, wherein said first, second, and third windings are magnetically coupled to one another via an E-shaped core.

2. The ripple reduction circuit of claim 1, wherein said impedance comprises an inductor in series with a capacitor.

3. The ripple reduction circuit of claim 1, wherein said E-shaped core comprises an E-core, and wherein the third winding is disposed on a middle arm of said E-core.

4. The ripple reduction circuit of claim 1, wherein said first winding is on a left arm of said "E-shaped" core, said second winding is on a right arm of said "E-shaped" core and said third winding is on a middle arm of said "E-shaped" core.

5. The ripple reduction circuit of claim 4, further comprising:
   a first magnetic shunt between said first and third windings; and
   a second magnetic shunt between said second and third windings, thereby reducing a coupling coefficient between said first and third windings and between said second and third windings.

6. The ripple reduction circuit of claim 1, wherein the third ripple current is combined with the first and second ripple currents to thereby negate the first and second ripple currents.

7. The ripple reduction circuit of claim 1, wherein said E-shaped core comprises first and second "U" cores.

8. A ripple reduction circuit for use in a current doubler rectifier having first and second inductors coupled via a first coupling coefficient via a first winding and a second winding on an inductor core, said first and second inductors generating first and second ripple currents, comprising:
   a third inductor coupled to said inductor core via a third and a fourth windings on said inductor core, wherein said windings are connected such that they form a series capacitance, and wherein said circuit generates a third ripple current opposing said first and second ripple currents and cancels said first and second ripple currents at an output of said circuit.

9. The ripple reduction circuit of claim 8, wherein said inductor core is an "E-shaped" core, said first winding is on a left arm of said "E-shaped" core, said second winding is on a right arm of said "E-shaped" core, said third and fourth windings are on a middle arm of said "E-shaped" core.

10. The ripple reduction circuit of claim 8, further comprising:
    a first magnetic shunt between said first and said third and fourth windings; and
    a second magnetic shunt between said second and said third and fourth windings, thereby reducing coupling coefficients between said first and second and said third and fourth windings.

11. The ripple reduction circuit of claim 10, wherein said inductor core is an "E-shaped" core, said first winding is on a left arm of said "E-shaped" core, said second winding is on a right arm of said "E-shaped" core, said third and fourth windings are on a middle arm of said "E-shaped" core, said first magnetic shunt is between a left arm and a middle arm of said "E-shaped" core and said second magnetic shunt is between a right arm and a middle arm of said "E-shaped" core.

12. The ripple reduction circuit of claim 8, wherein said E-shaped core comprises an "E" core.

13. The ripple reduction circuit of claim 8, wherein said E-shaped core comprises first and second "U" cores.

14. A current doubler rectifier circuit with ripple current cancellation comprising:
- a transformer having a primary winding and a secondary winding for receiving an input voltage;
- a first inductor having a first winding and a first and a second terminal, said first terminal of said first inductor connected to a first terminal of said secondary winding;
- a second inductor having a second winding and magnetically coupled to said first inductor and having a first and a second terminal, said first terminal of said second inductor connected to a second terminal of said secondary winding, said second terminal of said second inductor connected to said second terminal of said first inductor
- a first rectifier connected in series with said first inductor;
- a second rectifier connected in series with said second inductor;
- a third inductor having a third winding and magnetically coupled to said first and second inductors; and
- an impedance connected in series with said third inductor, wherein said first, second, and third windings are magnetically coupled to one another via an E-shaped core having a first end arm, a second end arm and a middle arm, and wherein each of said first, second, and third windings is disposed on one of said first end arm, second end arm, and middle arm of said E-shaped core.

15. The current doubler rectifier of claim 14, wherein said impedance comprises a fourth inductor in series with a capacitor.

16. The current doubler rectifier of claim 14, wherein said first winding is on said first end arm of said "E-shaped" core, said second winding is on said second end arm of said "E-shaped" core and said third winding is on said middle arm of said "E-shaped" core.

17. The current doubler rectifier of claim 14, wherein said E-shaped core comprises an "E" core.

18. The current doubler rectifier of claim 14, wherein said E-shaped core comprises first and second "U" cores.

* * * * *